(12) United States Patent
Hada (10) Patent No.: US 12,449,023 B2
(45) Date of Patent: Oct. 21, 2025

(54) EXTENSION-RETRACTION DEVICE

(71) Applicant: TOYOTA JIDOSHA KABUSHIKI KAISHA, Toyota (JP)

(72) Inventor: Yoshitaka Hada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/413,451

(22) Filed: Jan. 16, 2024

(65) Prior Publication Data

US 2024/0288054 A1    Aug. 29, 2024

(30) Foreign Application Priority Data

Feb. 27, 2023    (JP) ................................. 2023-028241

(51) Int. Cl.
*F16H 19/06*    (2006.01)
(52) U.S. Cl.
CPC ..... *F16H 19/0663* (2013.01); *F16H 19/0618* (2013.01); *F16H 19/0645* (2013.01)
(58) Field of Classification Search
CPC ......... B25J 9/104; B25J 18/025; F16H 19/06; F16H 19/0618; F16H 19/0645; F16H 19/0663; F16H 2019/0613
See application file for complete search history.

(56) References Cited

U.S. PATENT DOCUMENTS

| | | | |
|---|---|---|---|
| 2018/0351247 A1* | 12/2018 | Hall | H01Q 1/1235 |
| 2021/0194388 A1* | 6/2021 | Iwamoto | H02N 2/025 |
| 2021/0214203 A1* | 7/2021 | Erickson | B66F 11/00 |
| 2021/0341040 A1* | 11/2021 | Komura | F16H 9/26 |
| 2021/0341041 A1* | 11/2021 | Iwamoto | F16H 19/0618 |

FOREIGN PATENT DOCUMENTS

JP    2007-192257 A    8/2007

* cited by examiner

*Primary Examiner* — Joseph Brown
(74) *Attorney, Agent, or Firm* — SoraIP, Inc.

(57) ABSTRACT

An extension-retraction device in which: each of an outer strip member and an inner strip member includes one or more engaging portions; a tubular inner guide member and a cylindrical member are included, the inner guide member including a groove portion, and the cylindrical member being made up in a cylindrical shape so as to conform to an outer peripheral surface of the inner guide member and helically guiding each of the inner strip member and the outer strip member between an inner periphery of the cylindrical shape and an outer periphery of the inner guide member; and the cylindrical member is provided with a friction reducing portion that reduces friction at each of a location in which the inner periphery of the cylindrical member contacts the outer strip member and a location in which the inner periphery of the cylindrical member contacts the inner strip member.

12 Claims, 6 Drawing Sheets

EXTENSION-RETRACTION DEVICE

CROSS-REFERENCE TO RELATED APPLICATION

This application claims priority to Japanese Patent Application No. 2023-028241 filed on Feb. 27, 2023, incorporated herein by reference in its entirety.

BACKGROUND

1. Technical Field

The present disclosure relates to an extension-retraction device.

2. Description of Related Art

In recent years, an extension-retraction device has been known that forms a tubular extension-retraction structure that can be stored compactly by helically winding two strip members having two rows of engagement shapes, with the strip members being half-width offset from each other and overlapping each other.
Japanese Unexamined Patent Application Publication No. 2007-192257 (JP 2007-192257 A) discloses a helical advance and retreat actuator that includes a first strip member and a second strip member each configured in a strip shape, and in which the first strip member and the second strip member transition from a separated state of being spirally accommodated on a horizontal plane, to a tubular configuration state of being helically wound to form a tubular structure.

SUMMARY

However, in the helical advance and retreat actuator disclosed in JP 2007-192257 A, when performing a lifting and lowering operation, the spring member and a cylindrical member that guides the spring member come into contact with each other, and thus, energy loss due to friction may increase and wear of the strip member and the cylindrical member may occur.
The present disclosure has been made in view of the above-described issues, and the present disclosure provides an extension-retraction device that can reduce costs by improving efficiency by reducing friction between the strip member and the cylindrical member, and extending the life of the device by suppressing wear of the strip member and the cylindrical member.
An extension-retraction device according the present disclosure is an extension-retraction device that is helical and that uses an extendable and retractable tubular structure made up by winding two strip members with respect to each other, the two strip members being an outer strip member and an inner strip member in which: each of the outer strip member and the inner strip member includes one or more engaging portions, the engaging portions being arranged in parallel in a width direction, and being provided with protrusions and holes that are continuous in a longitudinal direction in each row;
    a tubular inner guide member and a cylindrical member are included, the inner guide member coming into contact with the outer strip member and the inner strip member on an outer peripheral surface of the inner guide member and including a groove portion that helically guides each of the outer strip member and the inner strip member, and the cylindrical member being made up in a cylindrical shape so as to conform to the outer peripheral surface of the inner guide member and helically guiding each of the inner strip member and the outer strip member between an inner periphery of the cylindrical shape and an outer periphery of the inner guide member; and
    the cylindrical member is provided with a friction reducing portion that reduces friction at each of a location in which the inner periphery of the cylindrical member contacts the outer strip member and a location in which the inner periphery of the cylindrical member contacts the inner strip member.
Thus, wear due to friction between the strip member and the cylindrical member can be suppressed.
According to the present disclosure, it is possible to provide the extension-retraction device that can suppress an increase in cost due to contact between the strip member and the cylindrical member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
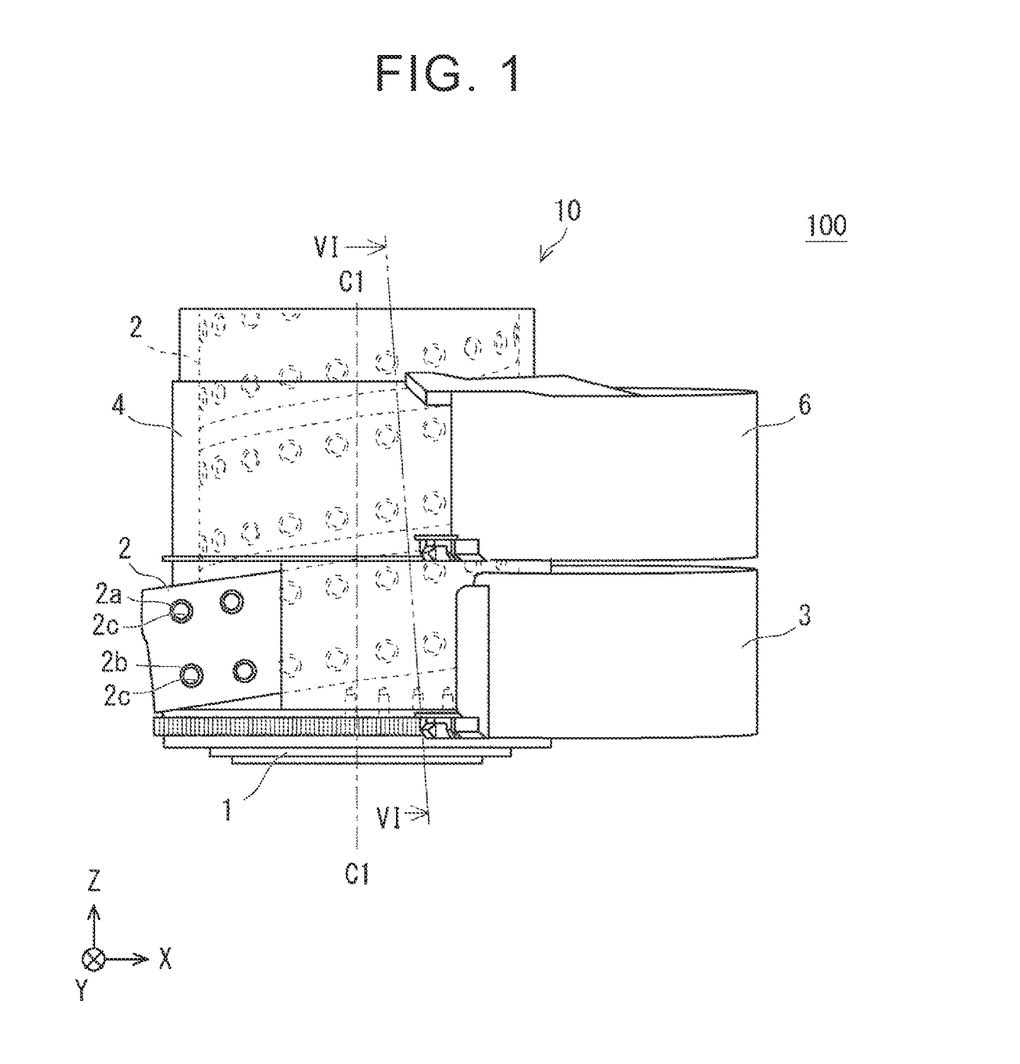
FIG. 1 is a side view showing an example of the configuration of an extension-retraction device.
Figure 2:
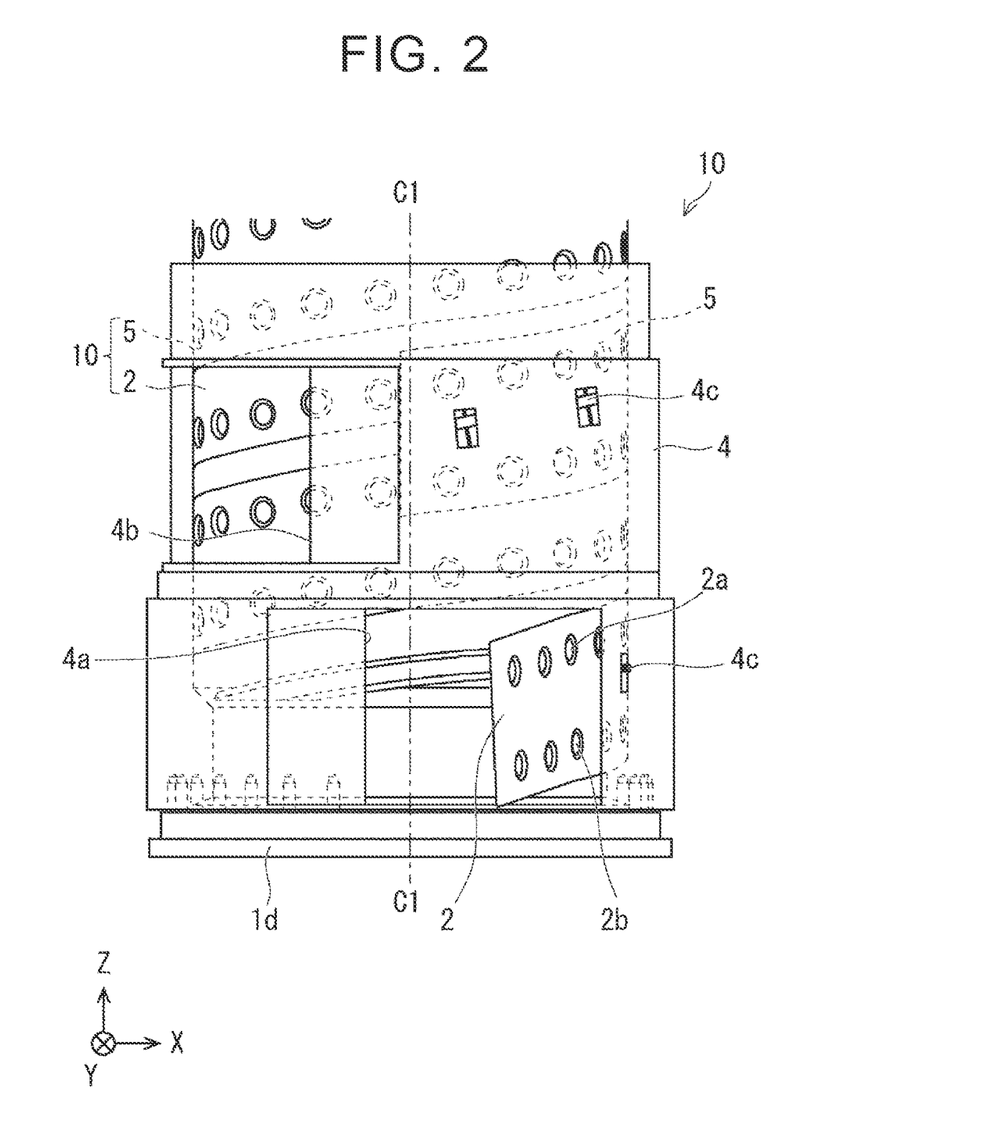
FIG. 2 is a side view showing an example of the configuration of the extension-retraction device.

Hereinafter, an extension-retraction device according to the present embodiment will be described with reference to the drawings. However, the present disclosure is not limited to the following embodiments. Further, in order to clarify the explanation, the following description and drawings are simplified as appropriate. In addition, the XYZ coordinates shown in the figures below are for convenience in explaining the positional relationship of the components; the positive Z-axis direction is vertically upward, and the XY plane is a horizontal plane, which is common among the drawings.
FIG. 1 is a side view showing an example of the configuration of the extension-retraction device 100. As shown in FIG. 1, the extension-retraction device 100 includes a cylindrical structure 10 and an inner guide member 1. The extension-retraction device 100 according to the first embodiment further includes a lower belt case 3, a cover 4, and an upper belt case 6.
The cylindrical structure 10 is expandable and contractible along its central axis, that is, in the C1 direction. Note that here, the C1 direction is the Z-axis direction.
FIG. 2 is a diagram showing the detailed configuration of the extension-retraction device 100, with the lower belt case 3 and the upper belt case 6 omitted. As shown in FIG. 2, the cylindrical structure 10 includes an outer belt 5 and an inner belt 2 disposed inside the outer belt 5. Note that the inner belt 2 and the outer belt 5 may be made of a flexible material. Specifically, steel can be used as the material for the inner belt 2 and the outer belt 5.

The inner belt 2 and the outer belt 5 are each formed to be long in the longitudinal direction, have a predetermined width perpendicular to the longitudinal direction, and have a predetermined width in both the longitudinal direction and the width direction. It is assumed that the thickness is thin in the thickness direction, which is the vertical direction. When the inner belt 2 and the outer belt 5 are arranged in the cylindrical structure 10, the thickness direction thereof becomes the inner and outer direction of the extension-retraction device 100.

Figure 3:
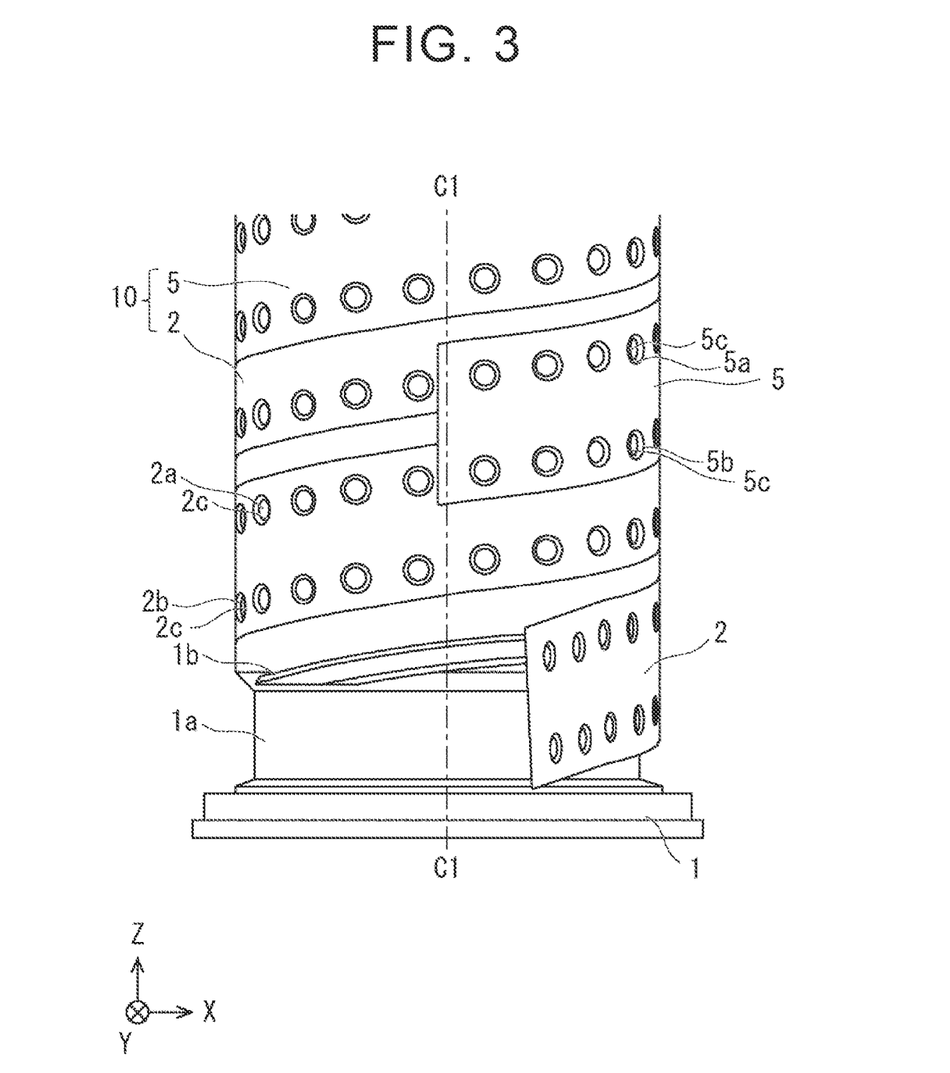
FIG. 3 is a side view of the extension-retraction device showing protrusions and holes in the inner belt and outer belt.

FIG. 3 is a side view showing the detailed configuration of the extension-retraction device 100, with the cover 4 omitted. As shown in FIG. 3, the inner belt 2 is an inner strip member including a plurality of protrusions 2a and 2b provided in two rows in the longitudinal direction of the inner belt 2 and a plurality of holes 2c.

The plurality of protrusions 2a are provided in one row of the two rows in the longitudinal direction of the inner belt 2 on the distal end side of the cylindrical structure 10 (upward in the Z-axis). The plurality of protrusions 2b are provided in one row on the root side of the cylindrical structure 10 (here, in the negative Z-axis direction) of the two rows in the longitudinal direction of the inner belt 2 so as to be parallel to the plurality of protrusions 2a. The plurality of protrusions 2a is located on the upper side compared to the plurality of protrusions 2b. In the cylindrical structure 10, the protrusion 2a and the protrusion 2b protrude toward the inner guide member 1 side.

Figure 4:
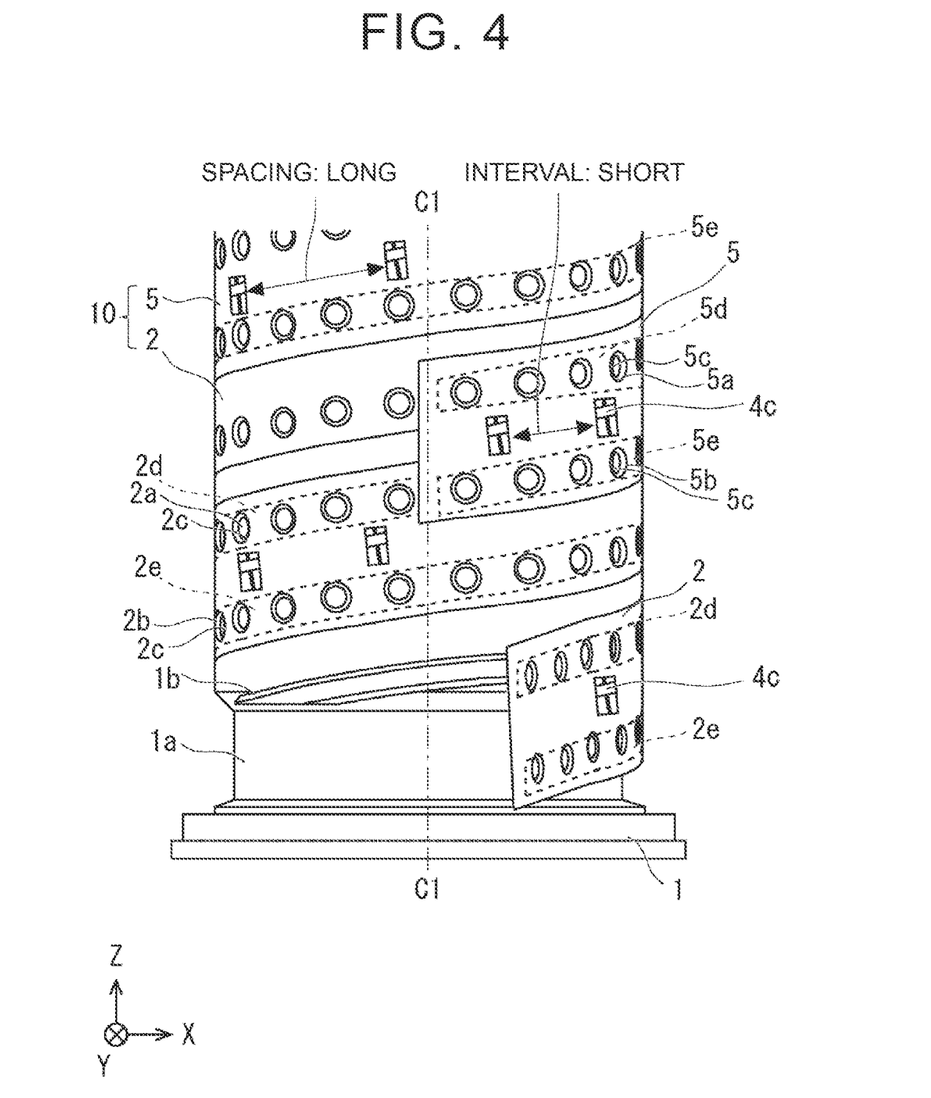
FIG. 4 is a side view of the extension-retraction device showing an example of the position of a roller provided on the cover and an engaging portion formed by a combination of protrusions and holes on the inner belt and the outer belt.

Here, FIG. 4 is a side view showing, in the configuration of the extension-retraction device 100, a first engaging portion 2d and a second engaging portion 2e of the inner belt 2, and a third engaging portion 5d and a fourth engaging portion 5e of the outer belt 5, which will be described later, and showing only the roller 4c omitting the inner wall surface forming the cover 4.

As shown in FIG. 4, a set of portions where a plurality of protrusions 2a and a plurality of holes 2c are provided on the upper side of the Z axis is a first engaging portion 2d, a plurality of protrusions 2b and a plurality of holes 2c. However, the set of portions provided on the lower side in the Z-axis is defined as the second engaging portion 2e. That is, in the inner belt 2, the first engaging portion 2d and the second engaging portion 2e are formed in parallel in the width direction and extend in the longitudinal direction.

Returning to FIG. 3, the outer belt 5 is an outer strip member including a plurality of protrusions 5a and 5b provided in two rows in the longitudinal direction of the outer belt 5 and a plurality of holes 5c.

Specifically, the plurality of protrusions 5a is provided in one of two rows in the longitudinal direction of the outer belt 5. The plurality of protrusions 5b is provided in the other one of the two rows in the longitudinal direction of the outer belt 5 so as to be parallel to the plurality of protrusions 5a. The plurality of protrusions 5a is located on the upper side compared to the plurality of protrusions 5b. The protrusion 5a and the protrusion 5b protrude from the outer edge of the hole 5c. In the cylindrical structure 10, the protrusion 5a and the protrusion 5b protrude toward the inner guide member 1 side.

Here, as shown in FIG. 4, a set of locations where the plurality of protrusions 5a and the plurality of holes 5c are provided on the upper side of the Z-axis is set to the third engaging portion 5d, and a set of locations where the plurality of protrusions 5b and the plurality of holes 5c are provided on the lower side of the Z-axis is defined as a fourth engaging portion 5e. That is, in the outer belt 5, the third engaging portion 5d and the fourth engaging portion 5e are respectively formed in parallel in the width direction and extend in the longitudinal direction.

In the cylindrical structure 10, when the inner belt 2 and the outer belt 5 are wound around the inner guide member 1, the plurality of protrusions 5a and the plurality of protrusions 5b are inserted into the corresponding plurality of holes 2c, so that mutually engage.

Figure 5:
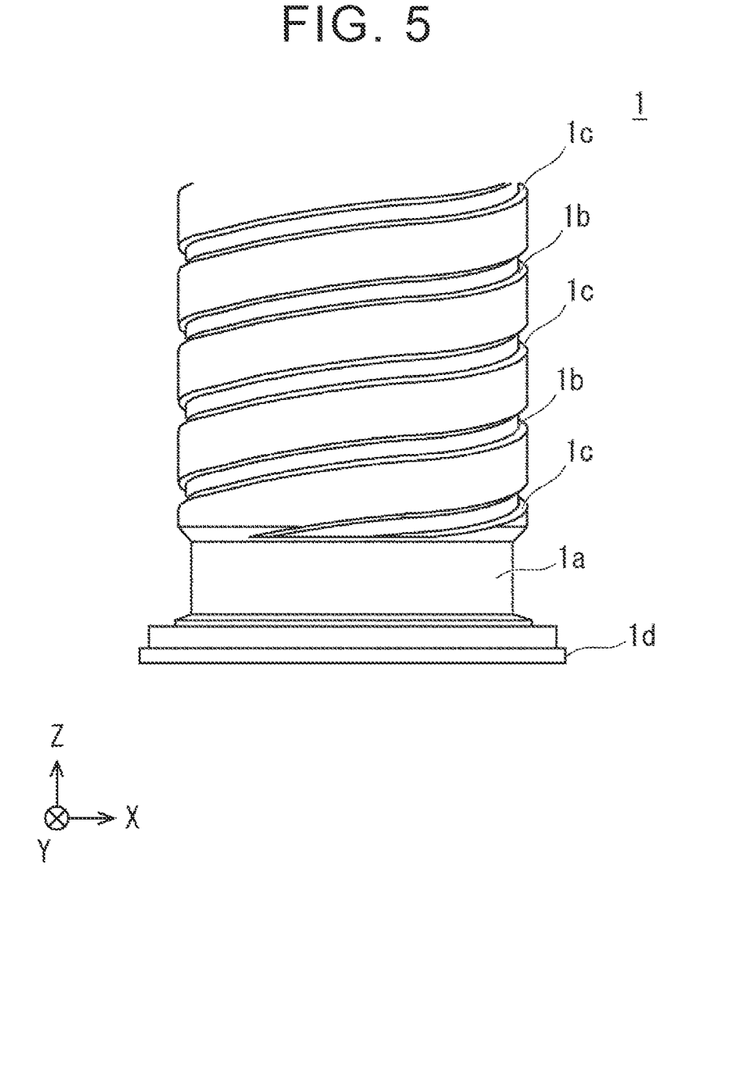
FIG. 5 is a side view of the inner guide member.

FIG. 5 is a side view showing an example of the inner guide member 1. The inner guide member 1 is a cylindrical body arranged inside the cylindrical structure 10. The outer peripheral surface 1a of the inner guide member 1 is formed with a first spiral groove 1b, a second spiral groove 1c, and a flange 1d that is in contact with the ground. The first spiral groove 1b and the second spiral groove 1c are formed in parallel on the outer peripheral surface 1a.

The first spiral groove 1b and the second spiral groove 1c are each provided at a distance from the flange 1d on the outer peripheral surface 1a. Note that the first spiral groove 1b extends along the plurality of projections 2a of the inner belt 2 in the cylindrical structure 10, and the first spiral groove 1b is possible to be fitted with the plurality of projections 2a of the inner belt 2. The second spiral groove 1c extends along the plurality of protrusions 2b of the inner belt 2 in the cylindrical structure 10, and can be fitted with the plurality of protrusions 2b of the inner belt 2.

The inner guide member 1 is held in a rotatable state around the central axis C1 of the cylindrical structure 10. The inner guide member 1 receives driving force from a drive source such as a motor (not shown), and rotates in one direction or the other around the central axis. Note that typically, the central axis of the inner guide member 1 and the central axis C1 of the cylindrical structure 10 are the same.

The cover 4 is a cylindrical body disposed inside the cylindrical structure 10 so as to cover the inner guide member 1. The cover 4 has openings 4a and 4b that are open on the outer peripheral surface of the cylindrical body. Furthermore, a plurality of friction reducing portions is formed inside the inner wall surface of the cover 4. Hereinafter, this friction reducing portion will be explained as a roller 4c.

Note that the friction reducing portion is formed such that friction when the friction reducing portion contacts the inner belt 2 is less than the friction when the inner belt 2 contacts the inner wall surface of the cover 4, and the friction when the friction reducing portion and the outer belt 5 contact with each other is lower than that when the outer belt 5 contacts the inner wall surface of the cover 4, and is made of a material that is more durable than the inner wall surface of the cover 4.

Specifically, as shown in FIG. 2, the opening 4a and the opening 4b are arranged in the cover 4, and the opening 4b is arranged above the opening 4a. Note that the opening 4a is formed in a size and shape that allows the inner belt 2 to be introduced from the outside to the inner guide member 1 side in the cover 4, and passes through the wall of the cover 4, which is a cylindrical body. It is a hole. Similarly, the opening 4b is formed in a size and shape that allows the outer belt 5 to be introduced from the outside to the inner guide member 1 side in the cover 4, and penetrates the wall of the cylindrical cover 4. This is the hole where the hole is located. It is assumed that the opening 4a and the opening 4b are formed near the bottom of the cover 4 which is in a cylindrical shape.

Figure 6:
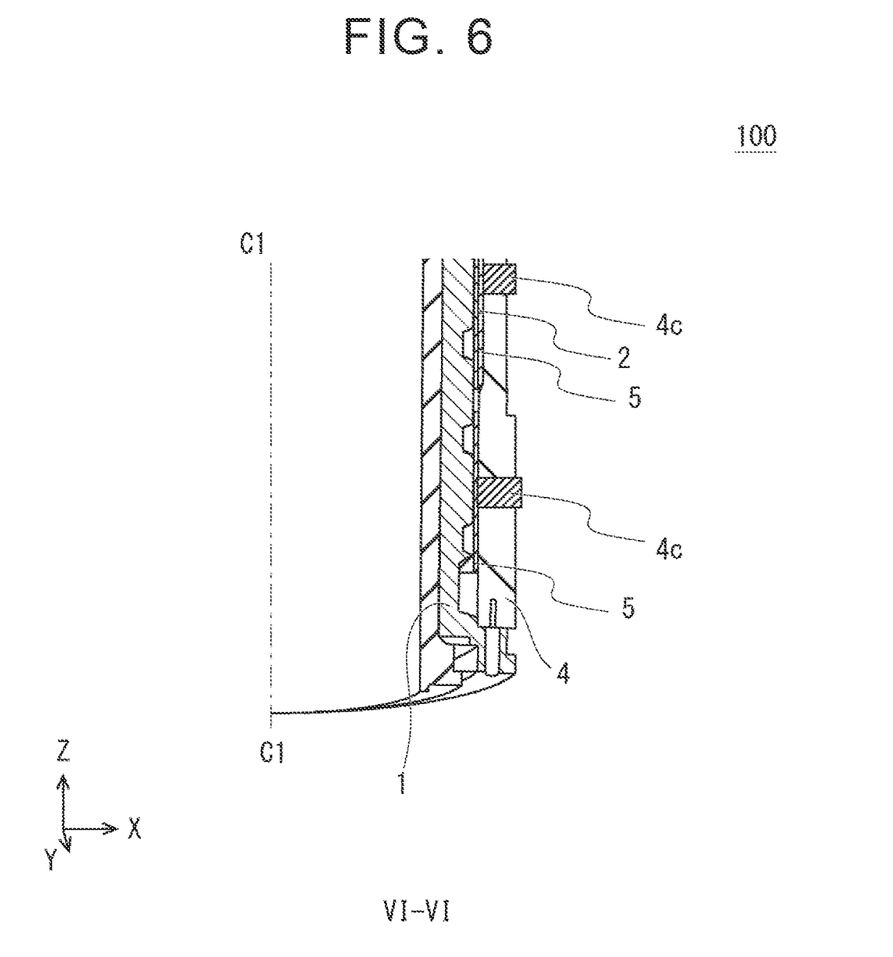
FIG. 6 is a cross-sectional view of a portion of the extension-retraction device.

As shown in FIGS. 2 and 4, the plurality of rollers 4c has a substantially cylindrical shape, and are arranged so that a portion thereof protrudes inward from the inner wall surface of the cover 4. Further, each of the plurality of rollers 4c is arranged so as to be rotatable with an axial direction parallel to the width direction of the outer belt 5 provided in a spiral shape. In other words, the plurality of rollers 4c are arranged to match the angle of the outer belt 5, and support the outer belt 5 by coming into contact with the outer peripheral surface of the outer belt 5 when the outer belt 5 forms a spiral. FIG. 6 is a sectional view taken along VI-VI in FIG. 1 showing a part of the extension-retraction device 100, and shows an example of a state where the roller 4c is in contact with the outer peripheral surface of the outer belt 5.

Here, as shown in FIG. 4, when the circumferential portion of the roller 4c comes into contact with the outer circumferential surface of the outer belt 5, which is provided in a spiral shape, the roller 4c is arranged at a position that does not contact a plurality of protrusions 5a, a plurality of protrusions 5b and a plurality of holes 5c of the outer belt 5. That is, the roller 4c is disposed so as to come into contact with the outer belt 5 at a position between the third engaging portion 5d and the fourth engaging portion 5e in the width direction.

Furthermore, regarding the arrangement of the rollers 4c in the cover 4, in the spiral direction when the outer belt 5 is guided in a spiral, the distance between adjacent rollers 4c is wide at a position far from the opening 4b, and the distance between them can be shortened at a position close to the opening 4b. Note that, when actually in this state, the plurality of rollers 4c are arranged at shorter intervals near the lower part of the cover 4, and are arranged at wider intervals near the upper part of the cover 4.

Note that, for example, the distance between the rollers 4c disposed close to the opening 4b is a constant short interval, and from the rollers 4c that are disposed at a position distant from the opening 4b by a predetermined distance in the spiral direction, the distance between the rollers 4c may be widened.

More specifically, at a position where the outer belt 5 and the inner belt 2 do not engage, or at a position where the outer belt 5 and the inner belt 2 begin to engage, the distance between the rollers 4c that the outer belt 5 contacts is set to a certain short distance. It can be an interval. On the other hand, near the upper part of the cover 4 where the outer belt 5 and the inner belt 2 are fully engaged, a self-retaining force is applied between the outer belt 5 and the inner belt 2, so that the force applied from the outer belt 5 to the cover 4 is reduced. Therefore, near the top of the cover 4, the number of rollers 4c that support the outer belt 5 can be reduced, and the distances between the rollers 4c can be increased.

Further, the roller 4c is provided at a position where the inner belt 2 contacts the inner peripheral surface of the cover 4 and a position where the roller 4c contacts the outer peripheral surface of the inner belt 2. In other words, the roller 4c is provided so as to abut and support the outer circumferential surface of the inner belt 2 at a location where the inner belt 2 and outer belt 5 are not engaged.

Note that when the circumferential portion of the roller 4c comes into contact with the outer circumferential surface of the inner belt 2 provided in a spiral shape, the roller 4c is arranged at a position where it does not come into contact with the plurality of protrusions 2a, the plurality of protrusions 2b, and the plurality of holes 2c of the inner belt 2. That is, the roller 4c is disposed so as to come into contact with the inner belt 2 at a position between the first engaging portion 2d and the second engaging portion 2e in the width direction.

As shown in FIG. 1, the lower belt case 3 is a case that stores the inner belt 2 so that it can be supplied. Typically, the lower belt case 3 is ring-shaped and is placed outside the cover 4.

The upper belt case 6 is a case that stores the outer belt 5 so that it can be supplied. Typically, the upper belt case 6 is ring-shaped and placed outside the cover 4.

Next, the operation of extending the cylindrical structure 10 will be explained.

When the inner guide member 1 rotates in a predetermined direction around the central axis C1, the inner guide member 1 winds up the outer belt 5 and the inner belt 2. Subsequently, as shown in FIGS. 1 and 2, the outer belt 5 is fed from the upper belt case 6 through the opening 4b of the cover 4 to the inner guide member 1, and the inner belt 2 is passed from the lower belt case 3 through the opening 4a of the cover 4 and is sent out to the inner guide member 1.

At this time, as shown in FIGS. 2 to 4, the outer belt 5 and the inner belt 2 are wound helically around the inner guide member 1 while engaging with each other. That is, the state changes from a separated state in which the outer belt 5 and the inner belt 2 are housed in the upper belt case 6 and the lower belt case 3, respectively, to a state in which the outer belt 5 and the inner belt 2 are spirally wound. Transition. This causes the cylindrical structure 10 to expand.

Next, the operation of contracting the cylindrical structure 10 will be explained. When the inner guide member 1 rotates around the central axis C1 in a direction opposite to the direction in which it was rotated when performing the above-described operation of extending the cylindrical structure 10, the inner guide members 1 have already engaged with each other. The outer belt 5 and the inner belt 2 that have been wound are now in an unraveled state.

At this time, the inner belt 2 passes from the inner guide member 1 through the opening 4a of the cover 4 and is drawn into the lower belt case 3, and the outer belt 5 passes from the inner guide member 1 through the opening 4b of the cover 4 and is drawn into the upper belt case 6. As a result, the inner belt 2 is stored in the lower belt case 3, and the outer belt 5 is stored in the upper belt case 6.

In this way, the inner belt 2 and the outer belt 5 transition between the cylindrical state in which they are engaged with each other and the state in which they are separated, thereby allowing the cylindrical structure 10 to transition between an extended state and a contracted state.

Here, when the inner belt 2 and the outer belt 5 form a cylindrical state in which they are engaged with each other, the outer belt 5 assumes a spiral shape when placed inside the cover 4. A force is generated that presses the outer belt 5 toward the inner wall surface of the cover 4.

On the other hand, the cover 4 is provided with a plurality of rollers 4c. Therefore, the outer belt 5 is in contact with the roller 4c on the inner periphery of the cover 4, and is spaced apart from the inner wall surface of the cover 4, so that the outer belt 5 can change its state into a spiral shape.

At this time, since the outer belt 5 and the roller 4c are in contact with each other, the frictional force applied to the outer belt 5 can be made smaller than when the outer belt 5 is in contact with the inner wall surface of the cover 4.

That is, the friction between the outer belt 5, which is a band material, and the cover 4, which is a cylindrical member, can be reduced to improve efficiency, and wear of each of the outer belt 5 and the cover 4 can be avoided.

Therefore, an increase in cost due to contact between the band material and the cylindrical member can be suppressed. The same applies to a portion where the inner belt 2 and the outer belt 5 are not in contact with each other and the inner belt 2 is in contact with the cover 4.

In addition, when the outer belt 5 is formed into a spiral shape, the force with which the outer belt 5 is pressed toward the inner wall surface of the cover 4 occurs more strongly at the position where the outer belt 5 is not engaged with the inner belt 2, at a position where the outer belt 5 starts to engaged with the inner belt 2, or the like.

Here, a large number of rollers 4c are arranged with short intervals between them at locations where it is necessary to strongly support the inner belt 2 and outer belt 5 in the lower part of the extension-retraction device 100, and the rollers 4c are arranged in large numbers with short intervals between them. In locations where the force supporting the outer belt 5 may be weak in the upper part of the extension-retraction device 100, the spacing between the rollers 4c can be increased to allow for a smaller number of rollers. Thereby, in the extension-retraction device 100, an appropriate number of rollers 4c can be arranged, and the number of rollers 4c to be used can be reduced, so that costs can be reduced.

The present disclosure is not limited to the above embodiments, and can be appropriately modified without departing from the spirit. That is, the above description has been omitted and simplified as appropriate for clarity of explanation, and those skilled in the art can easily change, add, or convert each element of the embodiments within the scope of the present disclosure.

Although it has been explained that the approximately cylindrical roller 4c is used as the friction reducing portion, it is possible to simply arrange a member having a lower coefficient of friction than the material generally used for the inner wall surface of the cover 4, or to use a spherical roller. Any suitable changes can be made as long as the friction generated between the outer belt 5 and the cover 4 can be reduced, such as by arranging a rotating body.

Further, in the above description, the roller 4c is provided in the cover 4 which is cylindrical and has an inner wall surface, but according to the above method, when the outer belt 5 is formed into a spiral shape, the outer belt 5 can be made to contact only the roller 4c without contacting the inner wall surface of the cover 4. That is, instead of having a cylindrical configuration with a wall surface, the cover 4 may have a configuration including a roller 4c and a frame that fixes the roller 4c.

In the above description, the distance between the rollers 4c disposed near the opening 4b is short, and the distance between the rollers 4c disposed far from the opening 4b is long. Alternatively, the distance between the rollers 4c disposed on the cover 4 may be constant without adjusting the distance as described above.

What is claimed is:

1. An extension-retraction device comprising:
   a tubular structure that is expandable and contractible along a central axis of the tubular structure;
   an inner guide member that is disposed inside the tubular structure, and configured to receive driving force from a drive source and rotate around a central axis of the inner guide member, the inner guide member including a spiral groove formed on an outer peripheral surface of the inner guide member; and
   a cylindrical member that has a cylindrical shape so as to conform to the outer peripheral surface of the inner guide member, wherein
   the tubular structure includes
   an inner strip member helically windable around the spiral groove,
   an outer strip member helically windable around an outer circumference of the inner strip member,
   an engaging portion of the inner strip member formed on the inner strip member and including a plurality of holes and a plurality of protrusions that protrude toward a side of the inner guide member, and
   an engaging portion of the outer strip member formed on the outer strip member and including a plurality of protrusions that protrude toward the side of the inner guide member,
   the plurality of the protrusions of the engaging portion of the outer strip member are inserted into the plurality of the holes of the engaging portion of the inner strip member such that the engaging portion of the outer strip member and the engaging portion of the inner strip member engage with each other, in a state where the outer strip member and the inner strip member are helically wound around the inner guide member,
   the plurality of the protrusions of the engaging portion of the inner strip member is fitted into the spiral groove in a state where the inner strip member is helically wound around the inner guide member,
   the cylindrical member includes a friction reducing portion that is configured to contact the outer strip member and the inner strip member such that the friction reducing portion reduces friction generated between an inner periphery of the cylindrical member and the outer strip member, and between the inner periphery of the cylindrical member and the inner strip member,
   the plurality of the protrusions of the engaging portion of the outer strip member include a first protrusion and a second protrusion provided in parallel in a width direction of the outer strip member, the width direction being a short side direction of the outer strip member, and
   the friction reducing portion contacts with the outer strip member at an intermediate position between the first protrusion and the second protrusion.

2. The extension-retraction device according to claim 1, wherein the cylindrical member includes a first opening through which the outer strip member is configured to be inserted between an outer periphery of the inner guide member and the inner periphery of the cylindrical member, from an outside of the cylindrical member.

3. The extension-retraction device according to claim 2, wherein:
   the friction reducing portion includes a first pair of the friction reducing portions and a second pair of the friction reducing portions, the first pair of the friction reducing portions including two friction reducing elements that are provided adjacent to each other, and the second pair of the friction reducing portions including two friction reducing elements that are provided adjacent to each other; and
   the first pair of the friction reducing portions is provided at a position farther from the first opening than a position of the second pair of the friction reducing portions in a spiral direction when the outer strip member is helically wound.

4. The extension-retraction device according to claim 3, wherein an interval between the two friction reducing elements in the first pair of the friction reducing portions is longer than an interval between the two friction reducing elements in the second pair of the friction reducing portions.

5. The extension-retraction device according to claim 2, further comprising a first belt case that is ring-shaped and disposed outside the cylindrical member, wherein
the outer strip member is configured to extend from the first belt case, pass through the first opening, and helically wind around the outer circumference of the inner strip member.

6. The extension-retraction device according to claim 5, wherein:
the first opening is located at a bottom of the cylindrical member;
the cylindrical member includes a plurality of the friction reducing portions; and
an interval between adjacent friction reducing portions becomes shorter toward a lower portion of the cylindrical member.

7. An extension-retraction device comprising:
a tubular structure that is expandable and contractible along a central axis of the tubular structure;
an inner guide member that is disposed inside the tubular structure, and configured to receive driving force from a drive source and rotate around a central axis of the inner guide member, the inner guide member including a spiral groove formed on an outer peripheral surface of the inner guide member; and
a cylindrical member that has a cylindrical shape so as to conform to the outer peripheral surface of the inner guide member, wherein
the tubular structure includes
an inner strip member helically windable around the spiral groove,
an outer strip member helically windable around an outer circumference of the inner strip member,
an engaging portion of the inner strip member formed on the inner strip member and including a plurality of holes and a plurality of protrusions that protrude toward a side of the inner guide member, and
an engaging portion of the outer strip member formed on the outer strip member and including a plurality of protrusions that protrude toward the side of the inner guide member,
the plurality of the protrusions of the engaging portion of the outer strip member are inserted into the plurality of the holes of the engaging portion of the inner strip member such that the engaging portion of the outer strip member and the engaging portion of the inner strip member engage with each other, in a state where the outer strip member and the inner strip member are helically wound around the inner guide member,
the plurality of the protrusions of the engaging portion of the inner strip member is fitted into the spiral groove in a state where the inner strip member is helically wound around the inner guide member,
the cylindrical member includes a friction reducing portion that is configured to contact the outer strip member and the inner strip member such that the friction reducing portion reduces friction generated between an inner periphery of the cylindrical member and the outer strip member, and between the inner periphery of the cylindrical member and the inner strip member,
the plurality of the protrusions of the engaging portion of the inner strip member include a first protrusion and a second protrusion provided in parallel in a width direction of the inner strip member, the width direction being a short side direction of the inner strip member, and
the friction reducing portion contacts with the inner strip member at an intermediate position between the first protrusion and the second protrusion.

8. The extension-retraction device according to claim 7, wherein the cylindrical member includes a second opening through which the inner strip member is configured to be inserted between an outer periphery of the inner guide member and the inner periphery of the cylindrical member, from an outside of the cylindrical member.

9. The extension-retraction device according to claim 8, wherein:
the friction reducing portion includes a first pair of the friction reducing portions and a second pair of the friction reducing portions, the first pair of the friction reducing portions including two friction reducing elements that are provided adjacent to each other, and the second pair of the friction reducing portions including two friction reducing elements that are provided adjacent to each other; and
the first pair of the friction reducing portions is provided at a position farther from the second opening than a position of the second pair of the friction reducing portions in a spiral direction when the inner strip member is helically wound.

10. The extension-retraction device according to claim 9, wherein an interval between the two friction reducing elements in the first pair of the friction reducing portions is longer than an interval between the two friction reducing elements in the second pair of the friction reducing portions.

11. The extension-retraction device according to claim 8, further comprising a second belt case that is ring-shaped and disposed outside the cylindrical member, wherein
the inner strip member is configured to extend from the second belt case, pass through the second opening, and helically wind around the inner guide member along the spiral groove.

12. The extension-retraction device according to claim 8, wherein:
the second opening is located at a bottom of the cylindrical member;
the cylindrical member includes a plurality of the friction reducing portions; and
an interval between adjacent friction reducing portions becomes shorter toward a lower portion of the cylindrical member.

\* \* \* \* \*